July 29, 1958      A. S. KROTZ      2,845,309
JOURNAL BEARING ASSEMBLY
Filed May 10, 1954      2 Sheets-Sheet 2
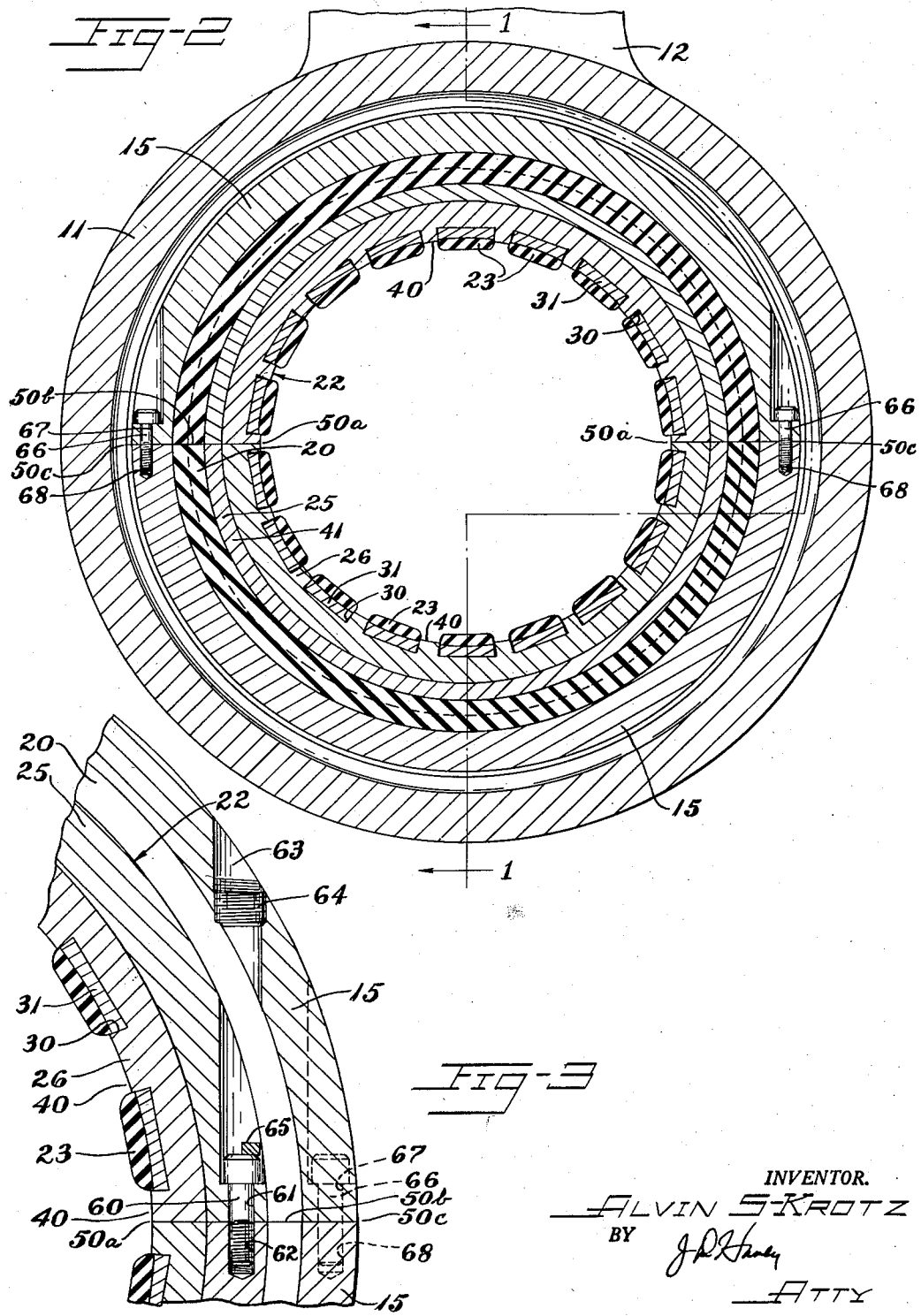
INVENTOR.
ALVIN S. KROTZ
BY
ATTY

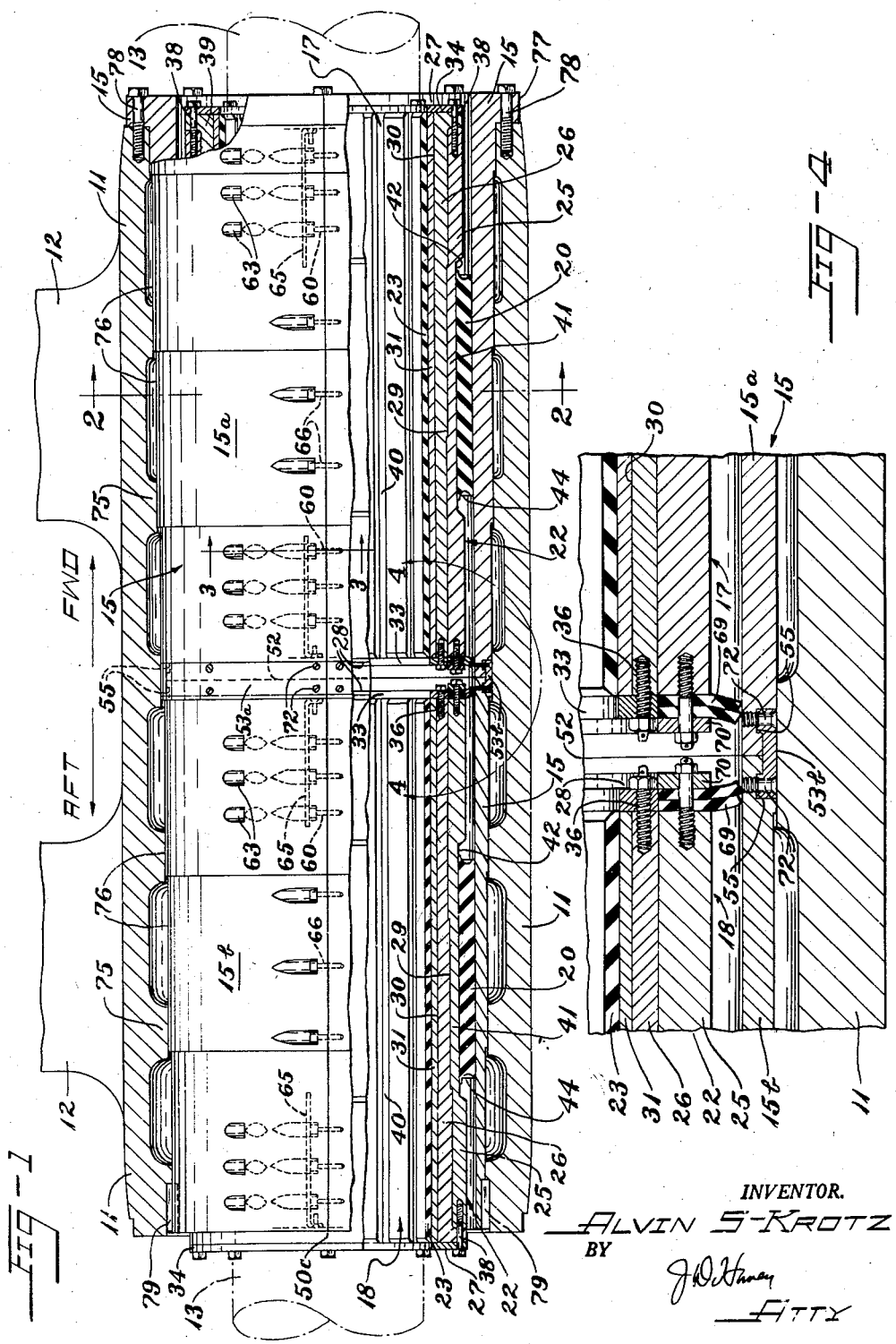

United States Patent Office 2,845,309
Patented July 29, 1958

2,845,309

JOURNAL BEARING ASSEMBLY

Alvin S. Krotz, Akron, Ohio, assignor to The B. F. Goodrich Company, New York, N. Y., a corporation of New York Application May 10, 1954, Serial No. 428,416

7 Claims. (Cl. 308—26)

This invention relates to a resilient rubber journal bearing assembly particularly adapted for marine propeller shafting and the like.

Resilient rubber bearings have been especially suitable for marine shafting because they have exceptional resistance to corrosion and to abrasion resulting from particles of foreign material which are normally carried in suspension in the water in which the shaft operates. Additionally, such bearings advantageously accommodate themselves to relatively small variations in the alignment of the shafting with the bearing. In certain installations, however, the bending movement at the shaft journal due to the weight of the shaft and the propellers is of large enough magnitude to cause an appreciable curvature along the shaft journal and, in service, this curvature may be substantially augmented by deflection of the shaft resulting from the pressure of waves or from various maneuvers of the vessel. Since rubber journal bearings are normally relatively long as compared with other types of journal bearings in order to provide a low unit pressure on the rubber journal layer, the effect of any appreciable curvature of the shaft journal greatly accelerates the normal wearing rate of the bearing. One of the most objectionable results of this curvature has been a squealing or howling noise which has occurred as the shaft is rotated and which has prohibited the use of this type bearings in certain naval vessels.

It is an object of this invention to provide a bearing assembly which operates quietly under the foregoing service conditions and has appreciably better wearing characteristics than the types of bearings previously proposed for this purpose. According to this invention, the bearing assembly includes an outer tubular shell which is receivable within the housing of a strut hanger or stern tube of a vessel. Within this shell there are two or more independent bearing units each having a resilient rubber journal layer engaged with the journal of the shaft. Each of these bearing units is individually suspended within the outer shell by a body of resilient rubber material which circumferentially surrounds the bearing unit and which is bonded to both the unit and the outer shell so that each of the bearing units may adjust itself to the deflection of the particular portion of the shaft journal it supports as the shaft is rotated. The resilient rubber sleeve of each of the bearings cooperates with the rubber journal layer of its respective bearing unit to accommodate thrust, torsion and shock loads imposed on the bearing unit as well as loads tending to tilt the bearing unit relative to the outer shell.

The invention will be further described with reference to the accompanying drawings which illustrate a preferred bearing assembly constructed in accordance with and embodying the principles of this invention.

In the drawings:

Fig. 1 is a longitudinal side elevation of the bearing assembly mounted in the housing of a strut hanger or the like, the housing being shown in longitudinal section and portions of the bearing being broken away to show details of its construction (see the line 1—1 of Fig. 2);

Fig. 2 is a cross-sectional view through the bearing assembly taken on line 2—2 of Fig. 1 and drawn to a larger scale than Fig. 1;

Fig. 3 is a cross-sectional view taken on line 3—3 of Fig. 1 and drawn to an enlarged scale; and Fig. 4 is an enlarged view of the area of Fig. 1 enclosed by the line 4—4.

The bearing assembly is shown in Fig. 1 installed within an annular housing 11 of a strut hanger 12 of a marine vessel. The bearing assembly extends coaxially through the housing 11 and is adapted to journal a shaft 13 which is indicated in chain-dotted lines in order to more clearly show the construction of the bearing members.

The principal elements of the bearing assembly include an outer tubular shell 15 which is received within the bore of the housing 11, and a pair of coaxially aligned bearing units 17 and 18, each of which is individually supported concentrically within the shell 15 by a body of resilient rubber material 20. The bearing unit 17 is located in the forward end of the outer shell (the end away from the propeller) and the bearing unit 18 is located in the after end of the other shell (the end toward the propeller) and these units are of identical construction. Each includes a rigid metal cylindrical sleeve 22, the bore of which is provided with a resilient rubber journal layer 23 which rotatably supports the shaft 13. Each of the rubber bodies 20 circumferentially surrounds the exterior surface of the sleeve 22 of its respective bearing unit and is vulcanized or otherwise securely bonded to the sleeve 22 and to the bore of the outer shell 15 to provide the sole support for the bearing unit within the shell 15. Forces applied to the bearing units due to deflection or other movement of the shaft which tend to displace the bearing units from their normal position of coaxial alignment with the shell 15 are opposed by the elastic deformation of the rubber bodies 20. It can be seen that since each of the bearing units is individually suspended, each is capable of movement in response to deflections of the portion of the shaft it engages independently of the other bearing unit.

The sleeve 22 of each bearing unit is formed with an outer or primary tube 25 and an inner or secondary tube 26 which nests concentrically within the primary tube. The primary tube 25 has a bore which is progressively narrower from the exposed end 27 of the sleeve 22 to the interior end 28 of the sleeve by means of a series of steppd annular surfaces 29 of progressively decreasing diameter. The exterior surface of the secondary tube 26 has a similar series of annular stepped surfaces complementary to the surfaces 29 so that the tubes may be fitted together in mating relation. The bore of the secondary tube 26 has a plurality of dovetail grooves 30 (see Fig. 2) extending lengthwise through the tube and spaced circumferentially around the bore to receive a series of individual staves 31, to each of which is bonded a layer of resilient rubber 23 for engaging and supporting the shaft journal. The staves 31 are each formed of flat metal bars with flaring sides to engage the dovetail grooves 30 and are assembled in the secondary tube by sliding them longitudinally into the dovetail grooves from the exposed end 27 of the sleeve. They are secured against lengthwise movement in the grooves by an annular retaining ring 33 at the interior end 28 of the bearing unit (see Fig. 4), and by an annular retaining ring 34 at the exposed end 27. The interior ring 33 is secured to the secondary tube by the studs 36 and radially overlaps the inner ends of the staves. The outer ring 34 radially overlaps the outer end of the staves and is secured by studs 38 which extend through a radial flange 39 on the secondary tube and into the primary tube to fasten the tubes together also.

The rubber layer 23 on each stave is substantially of uniform thickness and has rounded corners (see Fig. 2) along the sides of the stave to permit sand or other abrasive materials which may be present in the lubrication film between the shaft and the rubber layer 23 to be rolled by the rotation of the shaft into the spaces 40 or "grooves" between the staves. The spaces 40 between the staves are accessible to the sea water at each end of the bearing assembly so that this water may circulate between the staves and provide a lubrication film for the bearing.

The primary tube 25 of each bearing unit is relatively thick near its exposed end 27 and near its interior end 28 and has a generally thin wall portion 41 intermediate the thick portions formed by an annular channel 42 which circumferentially encircles the exterior surface of the primary tube. Each of the thick wall portions of the ends of the shell respectively extends for about one-third of the axial length of the shell so that the thin wall portion 41 at the medial center of the primary shell occupies about the remaining third of the axial length of the primary tube. The channel 42 provides a seat to receive the circumferentially-extending rubber body 20 which is bonded to the bottom of the channel 42 and to the portion of the bore of the outer shell opposite the channel. The rubber body 20 substantially fills the channel 42 and in width is about equal to one-third of the length of the primary tube 26. By locating the rubber body 20 in this medial position, each bearing unit may be readily tilted and twisted relative to the axis of the outer shell into any position corresponding to the deflection or other movement of the shaft. The channel 42 makes it possible to employ a body of rubber 20 which when the bearing assembly is installed for operation, is about twice the thickness of the journal layer 23 although the clearance between the ends of the sleeve 22 and the outer shell is less than the thickness of the rubber bodies 20.

As indicated in Figs. 1 and 2, the rubber bodies 20 are each substantially cylindrical, and their arcuate end faces 44 are concavely contoured so that when the rubber body is compressed upon installation and thereafter deformed in service, these faces will not tend to become wrinkled and cause stress concentrations to weaken the bonds. The rubber bodies 20 are each maintained under substantial radial compression between the sleeves 22 and the outer shell 15 to such an extent that compressive stress is always maintained in the body 20 even when the sleeve 22 is displaced laterally for the maximum movement permitted by the clearance between it and the outer shell. In other words, the rubber bodies 20 are precluded from ever being stressed radially in tension with the result that their resistance to fatigue is good.

The inner sleeves 22, their respective rubber bodies 20, and the outer shell 15 are each formed in two generally semi-cylindrical or axial sections which fit together on diametrically-opposite sides of the shaft journal to surround the shaft journal. As indicated in Fig. 2, the axial sections of the nesting tubes 25 and 26 of each sleeve 22 fit together along mating axial edges 50a; the sections of each rubber body 20 fit together along axial edges 50b; and the axial or semi-cylindrical sections of the outer shell 15 mate along the axial edges 50c. The outer shell is additionally circumferentially divided about its medial center at 52 (see Fig. 1) into a set of forward axial sections 15a and a set of after axial sections 15b. These sets of sections are secured together end to end in coaxial alignment by a pair of semi-circular locking rings 53a and 53b having a cross-sectional shape as indicated in Fig. 4 and which are received in circumferential grooves 55 having a complementary shape formed close to the abutting ends of the sections. The locking rings are secured to the outer shell sections flush with the external surface of the shell by screws 72.

This divided construction is advantageous both for the manufacture of the bearing assembly and in installing the assembly in a vessel. In the manufacture of the bearings, each semi-annular portion of the rubber body 20 may be vulcanized to its respective semi-cylindrical section of the outer shell 15, and to its respective semi-cylindrical section of the external tube 25 of the metal sleeve 22 independently of the other portions. Since the total length of the bearing assembly may be more than ten feet, this feature of the construction is particularly convenient. Each rubber bearing layer 23 is independently vulcanized to its respective stave 31 and these may be assembled with the interior tubes 26 either before or after all of the sections are assembled around the shaft journal. Each of the semi-cylindrical sections of the bodies 20 is normally thicker than the radial thickness it occupies after the sections are fully assembled to permit the bodies 20 to be radially compressed during the assembly procedure.

To install the bearing assembly the nesting tube sections 25 and 26 of each bearing unit preferably with the staves 31 in the grooves 30, are fitted together and then the mating portions of the bearing assembly are fitted around the shaft. The semi-cylindrical sections of the sleeves 22 of each bearing unit are then fastened together along their mating edges 50a by means of cap screws 60 (see Fig. 3) which are received in sockets 61 in the upper sleeve sections through which the screws extend into holes 62 in the mating edges 50a of the lower sleeve sections. The cap screws 60 are grouped near each end of the sleeves 22 and access holes 63 are provided through the outer shell 15 in order to insert and fasten each of these screws in position. Preferably a plug 64 or the like is threaded into each access hole 63 after the screws 60 have been inserted. Each group of screws 60 is collectively maintained in proper engagement by a locking key 65 (see Fig. 1) which extends through an appropriate opening from the adjacent end of the sleeve and transversely across each of the sockets above the heads of the screws.

After the sleeves 22 are fastened about the shaft, then the corresponding semi-cylindrical sections of the outer shell 15 are drawn together along their mating edges 50c and fastened by cap screws 66 which are received in sockets 67 in the upper section through which the screws extend and into holes 68 in the lower shell sections. As these shell sections are drawn together by the screws 66, the rubber bodies are radially compressed and urged together at their axial edges 50b.

Before the lengthwise sections of the outer shell are fastened together coaxially, an annular sealing gasket 69 (see Fig. 4) of rubber material is fastened to the interior end 28 of each sleeve 22 by a pair of semi-annular metal rings 70. These gaskets extend radially outward to the bore of the outer shell and provide a barrier to substantially preclude water from circulating about the outside surface interior ends of the sleeves 22. After this assembly the lengthwise sections of the outer shell are moved together into abutting relation and the locking rings 53a and 53b are secured in their respective grooves by the screws 72. Then the complete assembly is urged lengthwise along the shaft and seated within the housing 11. The bearing may be disassembled in similar fashion for repair or replacement and the staves 31 may be replaced without removing the assembly from the housing 11.

The bore of the housing 11 is formed with a series of circumferentially continuous, inwardly-projecting bosses 75 each having a bore of progressively smaller diameter from the forward end of the housing to the after end. The outer shell 15 is received in the bore and is supported by these bosses which respectively engage a series of annular surfaces 76 of progressively decreasing diameter, each complementary to the respective boss with which it is engaged. At the forward end of the outer shell there is provided an outwardly-extending radial flange 77 which is fastened to the end face of the housing by a group of studs 78. The opposite or after end of the outer shell is keyed to the housing by a key 79 to prevent relative rotation of the outer shell within the housing.

In certain installations where the curvature of the shaft journal is appreciably greater at the after end of the bearing assembly end, it is desirable to support the after bearing unit 18 by a rubber body 20 of a softer, and more elastic compound than that used for the rubber body 20 of the forward bearing unit. Normally, however, both rubber bodies 20 will have the same physical characteristics.

Since each of the bearing units 17 and 18 is independently suspended, it is evident that either is adapted to tilt relative to the outer shell to accommodate the particular position of the portion of the shaft journal with which it is engaged. Each of the rubber bodies 20 cooperates with the bearing layer 23 to isolate the hull of the vessel from the intense pounding and shock loads which are imposed on the bearing when a deflected shaft is rotated at high speed. A major proportion of shock loads of this type are cushioned by the rubber bodies 20 so that the rubber bearing layer 23 is protected from the pulverizing and crushing action of these loads. Further, each of the bearing units 17 and 18 is free to shift longitudinally relative to the outer shell with thrust type movements of the shaft or the like, the movement being accommodated by stressing the rubber bodies 20 in axial shear, thus relieving the forces resulting from such loads which tend to tear the bearing layer 23 longitudinally away from the staves. The rubber bodies 20 also permit the bearing units to rotate with the shaft to a limited extent when the pressure of the shaft against the journal layer 23 becomes excessive, the rubber bodies being stressed in torsional shear. Therefore excessive pressures on the bearing layers may be relieved and an adquate lubrication film restored between the layer and the shaft journal. These movements of the bearing units may occur independently or in various combinations with the tliting movements of the bearing units relative to the outer shell.

The rubber parts of the bearing assembly are preferably oil-resistant rubber compounds. The metals are naval brass, Monel or other corrosion-resistant material.

Variations of the structure disclosed may be made within the scope of the appended claims.

I claim:

1. A journal bearing assembly comprising a pair of coaxially-aligned rigid cylindrical sleeves each adapted to surround axially adjacent portions of a single shaft journal, a journal layer of resilient rubber material interposed between the interior of each of said sleeves and the shaft journal for resiliently supporting the shaft journal during rotation of the shaft, the journal layer including parallel lands extending lengthwise of each sleeve and lengthwise-extending grooves itnermediate said lands to distribute lubricant to said lands, each sleeve having a body of rubber circumferentially surrounding the exterior thereof medially of the sleeve, and a cylindrical outer shell concentrically surrounding both of said sleeves and to which each of said bodies of rubber is secured, the outer shell maintaining substantial radial compresison in each of said bodies of rubber and being receivable in a rigid support for the shaft, said sleeves being suspended within the outer shell solely by said bodies of rubber.

2. A journal bearing assembly comprising a pair of cylindrical tubular rigid sleeves each adapted to surround axially adjacent portions of a single shaft journal, a journal layer of resilient rubber material interposed between the interior of said sleeves and said shaft journal for resiliently suporting the shaft within said sleeves during rotation of the shaft, a rigid outer shell concentrically surorunding both said sleeves a spaced distance therefrom, a channel open toward said outer shell in the exterior surface of each sleeve and extending circumferentially about the sleeve in the medial portion of each sleeve intermediate the ends of the sleeve, a body of resilient rubber-like material in each of said channels, each said rubber body being bonded to the channel and to the portion of the outer shel lopposite the channel, said rubber bodies suporting their respective sleeves in coaxial alignment within the outer shell, and the outer shell being circumferentially contractible to radially compress said rubber bodies.

3. A journal bearing assembly comprising an outer rigid cylindrical tubular member extending the length of the bearing assembly, a pair of diametrically smaller rigid cylindrical tubular members positioned concentrically within said outer member and spaced radially therefrom, a journal layer of resilient rubber material in the bore of each of said smaller members adapted to engage axially adjacent portions of a shaft journal extending through said smaller members, a body of resilient rubber material extending circumferentially about each of said smaller members at the medial portion intermediate the ends of each of said members, each body being normally radially thicker than the radial spacing between said smaller members and said outer members, circumferential channels in at least one of said members to receive portions of each of said rubber bodies, each of the rubber bodies being bonded to its respective channel and to the portion of the member opposite the channel to provide the sole support for each of said smaller members within the outer member, and said outer member being circumferentially contractible to maintain said rubber bodies under radial compression.

4. A journal bearing assembly comprising an outer cylindrical tubular shell member formed of mutually engageable arcuate axial shell sections, a pair of cylindrical tubular sleeves each formed of mutually engageable arcuate axial sleeve sections and arranged in coaxial alignment concentrically within the outer shell, a journal layer of resilient rubber material within the bore of each of said sleeves adapted to resiliently engage a shaft journal extending through both of said sleeves, each of said sleeve sections having resilient rubber material interposed between its medial portion intermediate the ends of each sleeve section and the adjacent surface of its corresponding outer shell section, and bonded to said sections, at least one of said sections including a channel into which said rubber material is recessed and the rubber material of the several sections mating together when said sleeve sections and said shell sections are assembled to form a cylindrical body of rubber encircling each sleeve, the width of said body of rubber being in the order of not more than one-third the axial length of each of said sleeves, means for fastening the sleeve sections in mating relation, openings in said shell sections providing access to said means, and means for securing the outer shell sections in mutual mating relation to maintain said bodies in radial compression against their respective sleeves.

5. A journal bearing assembly comprising an outer cylindrical tubular shell formed of a first set of axially engageable arcuate shell sections and a second set of axially engageable arcuate shell sections, the first set endwise abutting the second set, a pair of cylindrical tubular sleeves arranged in coaxial alignment within the outer shell in radially spaced relation to the outer shell, one of the sleeves fitting within said first set of shell sections and the other of the sleeves fitting within said second set of shell sections, each of the sleeves comprising an external primary tube and an internal secondary tube nested concentrically within the primary tube, the tubes being formed in axially engageable arcuate sections, a journal layer of resilient rubber on the bore of each of said secondary tubes adapted to resiliently engage a shaft journal extending through both said sleeves, each of said primary tube sections having resilient rubber material interposed between its medial portion intermediate the ends of each section and the adjacent surface of its corresponding section of the outer shell, at least one of the sections between which the rubber material is interposed being recessed to receive said rubber material and the rubber material being vulcanized to each of said sections, the rubber material of the several sections mating when the sections are assembled to define a generally cylindrical body of rubber circumferentially surrounding its respective sleeve at the medial portion thereof and providing the sole support for its respective sleeve within the outer shell, the width of each said body of rubber being in the order of not more than one-third the axial length of its respective sleeve, means for fastening said tube sections in mating relation about a shaft journal, openings in said outer shell sections to provide access to said fastening means, and means for fastening said outer shell sections integrally together to maintain said rubber bodies under radial compression.

6. A journal bearing assembly comprising a generally cylindrical rigid tubular outer shell, a pair of generally cylindrical tubular rigid sleeves disposed within said outer shell, the sleeves being coaxial of each other and concentric with said outer shell and the sleeves being disposed in axially spaced relation to each other and in radially spaced relation to said outer shell to permit appreciable longitudinal tilting of each said sleeve relative to the other sleeve and to said outer shell, a journal layer of resilient rubber material in the interior of each said sleeve, and each sleeve having a body of rubber about the medial center thereof and extending to the interior surface of said outer shell, each of said bodies of rubber being maintained by said outer shell under radial compression and providing the sole support for said sleeves within said outer shell.

7. A journal bearing assembly comprising an outer tubular shell formed of an assemblage of arcuate shell sections, a pair of generally cylindrical tubular bearing sleeves arranged coaxially of each other concentrically within the outer shell in axially-spaced relation one from another and adapted to embrace a shaft journal extending through the sleeves, each sleeve comprising an assemblage of arcuate sections corresponding substantially to said outer shell sections, resilient rubber material interposed between and fastened to corresponding sections of each sleeve and said shell sections, said rubber-like material forming in the assembly a substantially annular body of rubber externally encircling each sleeve at the medial portion thereof and providing the sole support for each sleeve within the shell, means fastening the sections of each sleeve in mating relation, openings in said shell to provide access to the latter said means, and means fastening the outer shell sections in mating relation to maintain said rubber-like material in radial compression against the respective bearing sleeves.

References Cited in the file of this patent

UNITED STATES PATENTS

| 1,919,375 | Maclachlan et al. | July 25, 1933 |
| 1,931,026 | Lee | Oct. 17, 1933 |
| 2,282,345 | Ruths | May 12, 1942 |
| 2,608,751 | Hutton | Sept. 2, 1952 |

FOREIGN PATENTS

| 813,760 | France | June 8, 1937 |